(12) United States Patent
Muyskens et al.

(10) Patent No.: US 8,635,908 B2
(45) Date of Patent: Jan. 28, 2014

(54) FLUID TILT SENSOR WITHIN INK TANK SUPPLY ITEM FOR MICRO-FLUID APPLICATIONS

(75) Inventors: Robert H. Muyskens, Lexington, KY (US); Gregory T. Webb, Lexington, KY (US); Trevor D. Gray, Versailtes, KY (US); Jason T. McReynolds, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 180 days.

(21) Appl. No.: 13/241,948

(22) Filed: Sep. 23, 2011

(65) Prior Publication Data

US 2013/0074594 A1    Mar. 28, 2013

(51) Int. Cl.
*G01F 23/26* (2006.01)

(52) U.S. Cl.
USPC ........................................ 73/304 C

(58) Field of Classification Search
USPC ....... 73/304 C; 33/534, 366.19; 381/284, 280
See application file for complete search history.

(56) References Cited

U.S. PATENT DOCUMENTS

| | | | |
|---|---|---|---|
| 3,929,071 A | 12/1975 | Cialone | |
| 4,201,085 A | 5/1980 | Larson | |
| 4,220,044 A * | 9/1980 | LeBlanc et al. | 73/170.01 |
| 4,415,886 A | 11/1983 | Kyogoku | |
| 4,528,760 A * | 7/1985 | Plummer | 33/366.14 |
| 4,811,491 A * | 3/1989 | Phillips et al. | 33/366.12 |
| 4,853,718 A | 8/1989 | Elhatem | |
| 5,289,211 A | 2/1994 | Morandotti | |
| 5,423,214 A * | 6/1995 | Lee | 73/304 C |
| 5,635,962 A | 6/1997 | Goldis | |
| 5,682,184 A | 10/1997 | Stephany | |
| 5,788,388 A | 8/1998 | Cowger | |
| 7,370,528 B2 | 5/2008 | Scardovi | |
| 7,510,257 B2 | 3/2009 | Jung | |
| 7,555,231 B2 | 6/2009 | Etter | |
| 2005/0210979 A1* | 9/2005 | Urano et al. | 73/514.09 |
| 2005/0229700 A1* | 10/2005 | Chai et al. | 73/304 R |

OTHER PUBLICATIONS

D.W. Phillips, "Capacitive Ink Level Detector", IBM Technical Disclosure Bulletin, vol. 16, No. 10, Mar. 1974, pp. 3293 and 3294.

* cited by examiner

*Primary Examiner* — Daniel S Larkin
*Assistant Examiner* — Jamar Ray

(57) ABSTRACT

A container for holding a volume of fluid and having a housing defining an interior for retaining the volume of fluid; at least one in-tank tilt sensor connected to a controller and disposed inside the housing for generating a signal corresponding to a level of fluid inside the housing; and a support material attached to the housing and connected to the at least one in-tank tilt sensor to mechanically support the at least one in-tank tilt sensor such that the at least one in-tank tilt sensor is not in direct contact with the fluid inside the housing. The in-tank tilt sensor detects a change in fluid level which may only be caused by tilting of the imaging device. When tilting is registered, protective action is taken to prevent fluid from leaking.

6 Claims, 16 Drawing Sheets

FLUID TILT SENSOR WITHIN INK TANK SUPPLY ITEM FOR MICRO-FLUID APPLICATIONS

FIELD OF THE DISCLOSURE

The present disclosure relates generally to micro-fluid applications, such as inkjet printing. The present disclosure relates particularly to a fluid container that senses tilting during such application. Tilting is determined based on capacitive sensing by in-tank tilt sensors.

BACKGROUND

The art of printing images with micro-fluid technology is relatively well-known. A permanent or semi-permanent printhead has access to a local or remote supply of fluid. The fluid is usually stored in a container, such as a tank or a cartridge. In an imaging device having a local supply of fluid, the container is installed within the housing of the imaging device. The fluid ejects from the printhead nozzles to a print media in a pattern of pixels corresponding to images being printed.

During printing, the printhead maintains a backpressure so that fluid cannot leak out of the printhead nozzles. Hence, tilting an imaging device having a local supply of fluid may cause serious issues. This is most commonly a problem for imaging devices which rely on the difference in the height of the printhead and the fluid container for setting the backpressure of the printhead.

Knowing whether or not an imaging device is tilted lends itself to a variety of consumer features. Imaging devices can warn users that the imaging device is tilted. Also, an operation of the imaging device may be suspended if the imaging device is tilted in order to avoid fluid spillage. Users may also be advised to perform corrective measures.

Manufacturers have implemented a variety of container tilt measurement systems and techniques. Each has its own set of advantages and problems. Some are cheap while others are costly. Some work as intended while others have proven so poorly that users regularly ignore them. Still others are complex, including complicated processing, algorithms. The optimum balance is to provide accurate tilt measurement over a lifetime of a fluid container, but without adding complexity or cost.

One existing method for detecting tilting is to install a traditional electrical tilt sensor on the imaging device's circuit board. When this sensor detects that the imaging device is tilted, the firmware closes a fluidic valve between the printhead and the fluid container in order to prevent the fluid from leaking out of the printhead nozzles. A dedicated electrical tilt sensor increases the cost of the imaging device.

Accordingly, a need exists in the art for an alternative method for detecting tilt in the imaging device.

SUMMARY

The above-mentioned and other problems become solved with capacitive tilt detection system utilizing existing sensors that an imaging device uses in detecting the level of fluid in a fluid container.

The basic concept of capacitive tilt detection is a method by which a pair of metal plates or electrodes are placed on the fluid container to constitute a capacitive in-tank sensor with one electrode being used in conjunction with a transmit circuit, and the other being used as a receiver. In imaging devices which use capacitive in-tank sensors to measure the level of fluid inside the container, the same sensors may be utilized to determine tilting of the container. Utilizing the same sensors to determine the level of fluid and to determine tilting of the container lowers the manufacturing cost.

Upon application of electrical energy, circuitry measures capacitance of the fluid residing in the space between the capacitive electrodes. When the transmit electrode is stimulated, the receiver electrode and circuitry measures the capacitance of the fluid residing in the space between the capacitive electrodes. The capacitance varies according to the volume of fluid residing in the space between the capacitive electrodes. The volume of fluid between the capacitive electrodes changes as the level of fluid between the capacitive electrodes changes. This method of using capacitive electrodes in detecting tilting of the container has several benefits inherent to it, including that no probe or other sensor intrusion into the tank is needed to measure capacitance, no clear window is needed for optical sensing at each level, and the same pair of capacitive electrodes used in ink level detection provides the capacitance readings to be used in detecting tilting during the lifetime of the fluid container.

The present disclosure uses the concept and process by which capacitive electrodes are used to detect titling of a fluid container or ink tank, and to take the appropriate precautions to prevent the imaging device from possibly leaking fluid, such as by closing a valve to prevent fluid from flowing to the printhead. The present disclosure operates to detect tilt by measuring changes in fluid level which are caused by tilting of the fluid container.

In a representative embodiment, a container for an imaging device holds a volume of fluid. Its housing defines an interior and a fluid exit port (not shown). A pair of metal plates or electrodes is disposed on the housing. These metal plates function as capacitive electrodes and measure the capacitance of the volume of fluid between the capacitive electrodes. The capacitance reading is in proportion to the volume of fluid between the capacitive electrodes but not necessarily to the entire volume of fluid inside the container. Even with a constant volume of fluid, the capacitance readings provided by the capacitive electrodes may vary if the container is tilted towards various directions at varying extent. Changes in the volume of fluid between the capacitive electrodes equate to changes in the capacitance readings. When the container is not tilted, the capacitance reading provided by the capacitive electrodes may be used as a reference capacitance during tilt detection. For example, when the same container with the same volume of fluid is tilted towards the location of the capacitive electrodes, the volume of fluid between the capacitive electrodes increases and the capacitance reading also increases. Conversely, when the container is tilted towards the opposite direction, the volume of fluid between the capacitive electrodes decreases and the capacitance reading also decreases. In each occasion, tilting may be detected by comparing the capacitance reading to the reference capacitance or the capacitance reading when the container is not tilted. The differences between the capacitance readings may be used to determine the extent of the tilt.

Further embodiments contemplate setting a new reference capacitance after a predetermined period of operation of the imaging device, taking into account the amount of fluid consumed or used during operation. The latest capacitance reading which is within allowable variances may also be saved into a memory to serve as the next reference capacitance.

Still other embodiments contemplate first and second electrode pairs on opposing sides of a housing. When one pair gives capacitance readings higher or lower than its initial or earlier readings and the other pair gives contrarian capacitance readings lower or higher than its initial or earlier readings, respectively, tilt of the housing is made known. The extent of tilting may be also inferred based on amounts of change from one reading to the next.

These and other embodiments are set forth in the description below. Their advantages and features will become readily apparent to skilled artisans. The claims set forth particular limitations.

BRIEF DESCRIPTION OF THE DRAWINGS

The accompanying drawings incorporated in and forming a part of the specification, illustrate several aspects of the present disclosure, and together with the description serve to explain the principles of the present disclosure. In the drawings.

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the present disclosure. It is to be understood that other embodiments may be utilized and that process, electrical, and mechanical changes, etc., may be made without departing from the scope of the present disclosure. The following detailed description, therefore, is not to be taken in a limiting sense and the scope of the present disclosure is defined only by the appended claims and their equivalents.

Figure 1:
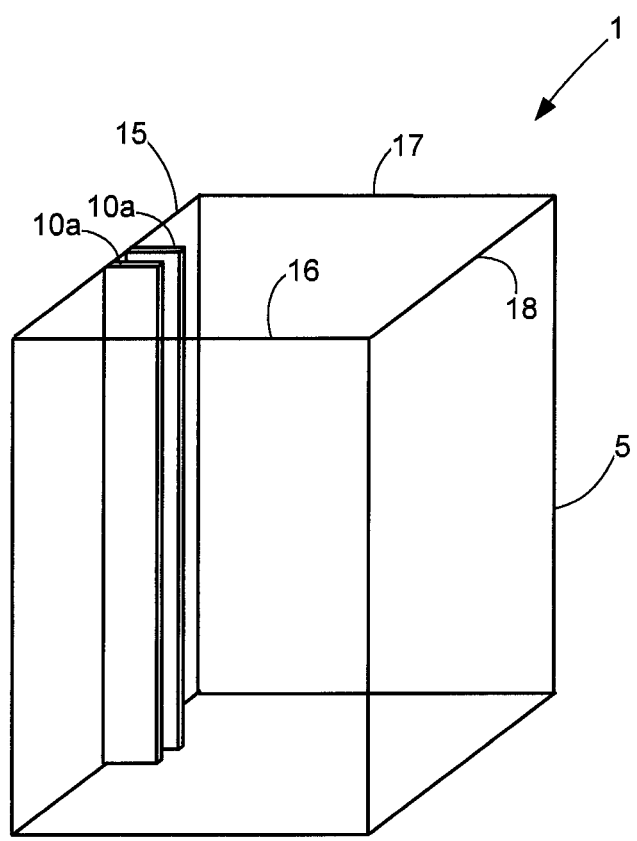
FIG. 1 is a diagrammatic view of a fluid container having a pair of capacitive electrodes as in-tank sensors in accordance with the present disclosure.

With reference to FIG. 1, a container 1 to hold a volume of fluid may include a housing 5 and at least one pair of opposed capacitive electrodes 10a disposed on the housing 5. The fluid may be any of a variety of inks, such as those based on dye or pigmented formulations, whether water-based or solvent-based. The fluid may also typify varieties of color, such as cyan, magenta, yellow, black, etc. The item may useful in many applications such as inkjet printing, medicinal delivery, forming circuit traces, food processing, chemical manufacturing, etc. The housing 5, in this example embodiment may have a first side 15, a second side 16, a third side 17 and a fourth side 18. The at least one pair of opposed capacitive electrodes 10a may be disposed on the first side 15. A person skilled in the art knows that the housing 5 may be shaped differently and the present disclosure may apply to fluid containers having different geometric configuration, such as but not limited to cylindrical fluid containers and oval fluid containers.

Figure 2:
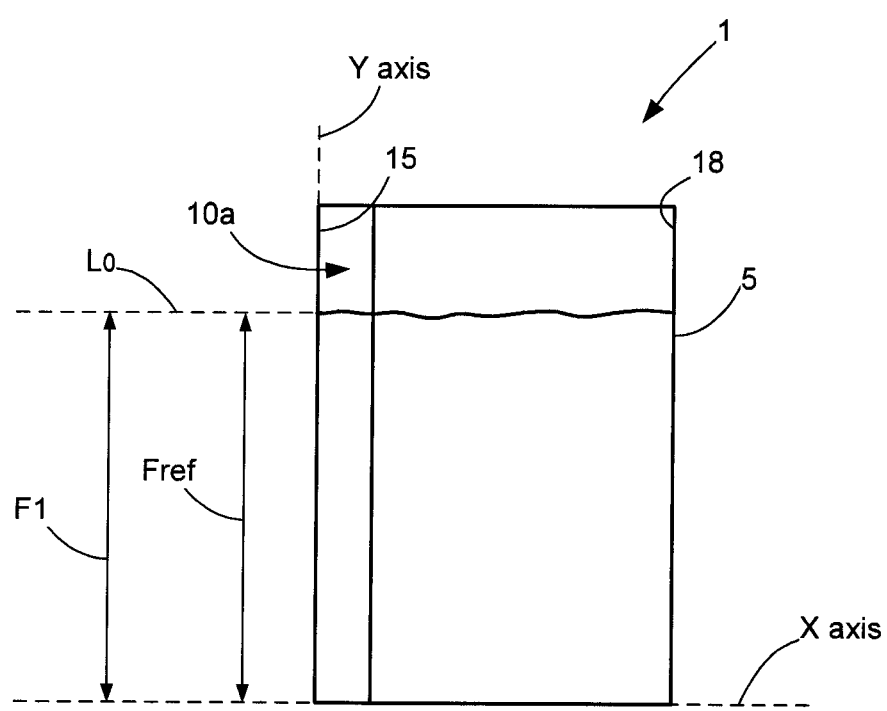
FIG. 2 is a diagrammatic view of a fluid container of FIG. 1 showing the fluid level at zero tilt.
Figure 3:
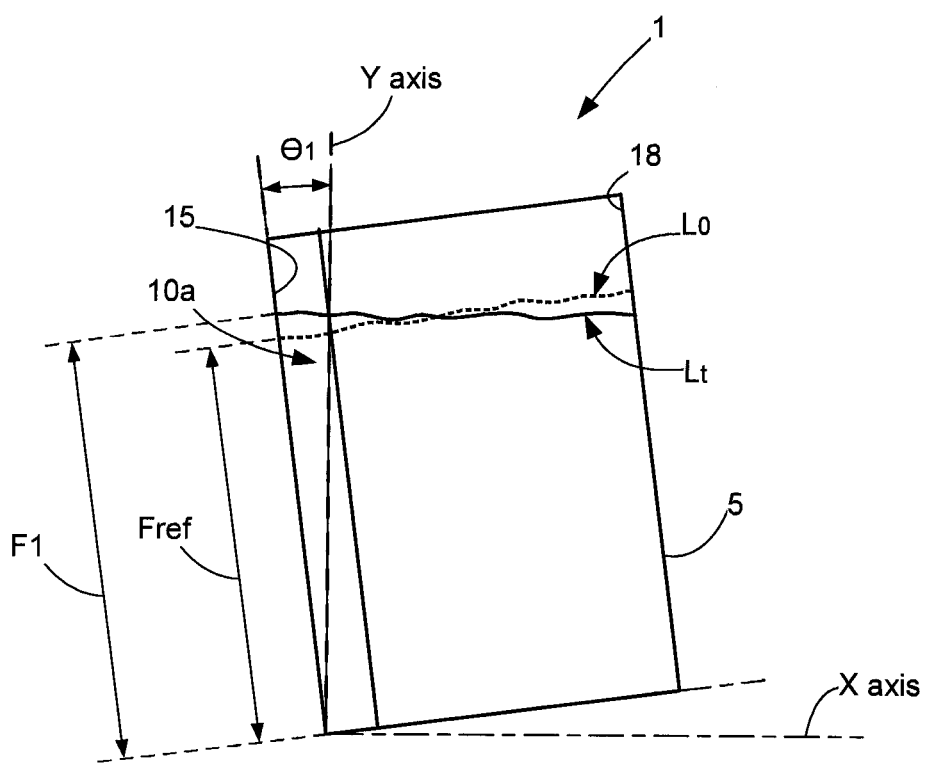
FIG. 3 is a diagrammatic view of a fluid container of FIG. 1 showing the fluid level when the container is tilted towards the location of the pair of capacitive electrodes by an angle θ1.

FIG. 2 depicts the container 1 containing fluid at fluid level L0. Fluid level L0 is a fluid level at zero tilt. At fluid level L0, the capacitive electrodes 10a may provide a capacitance reading Fref corresponding to the volume of fluid between the capacitive electrodes 10a. The capacitance reading Fref may become a reference capacitance. During operation, the capacitive electrodes 10a may provide a first capacitance reading F1. At zero tilt and at fluid level L0, the first capacitance reading F1 may be approximately equal to the reference capacitance Fref. When the container 1 is tilted at an angle θ1 towards the first side 15, as shown in FIG. 3, the volume of fluid between the capacitive electrodes 10a may increase due to a change in fluid level from fluid level L0 to fluid level Lt. With the container 1 tilted and with an increased volume of fluid between the capacitive electrodes 10a, the first capacitance reading F1 may become higher compared to the reference capacitance Fref.

Figure 4:
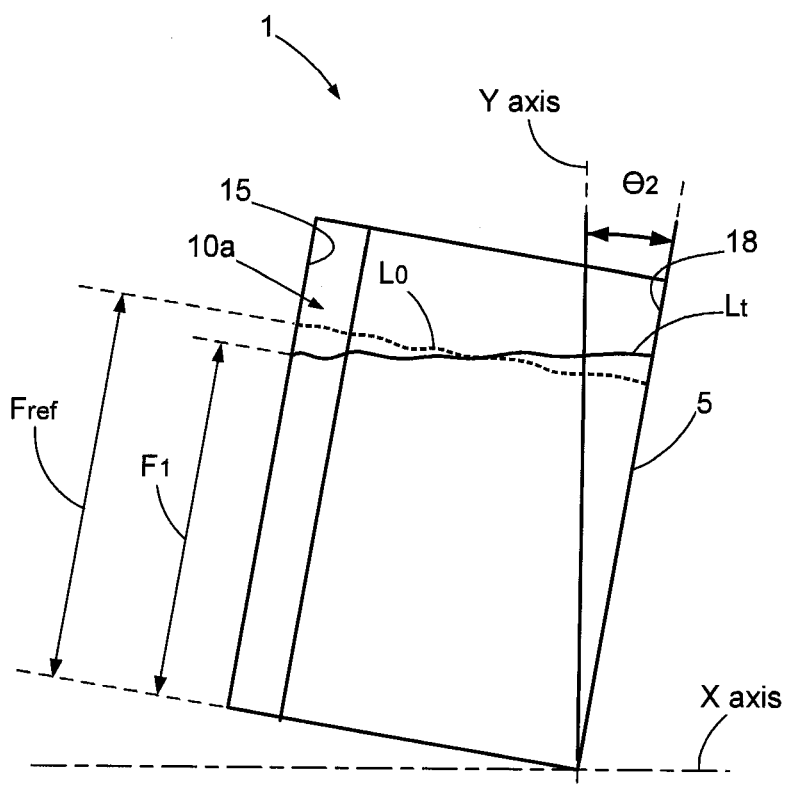
FIG. 4 is a diagrammatic view of a fluid container of FIG. 1 showing the fluid level when the container is tilted away from the location of the pair of capacitive electrodes by an angle θ2.

FIG. 4 is a view of the fluid container 1 of FIG. 1 showing fluid levels L0, Lt when the container 1 is tilted towards the fourth side 18 by an angle θ2. In this instance, the volume of fluid between the capacitive electrodes 10a may decrease and the first capacitance reading F1 may become lower compared to the reference capacitance Fref. In FIGS. 3 and 4, tilting of the container 1 may be detected by comparing the first capacitance reading F1 to the reference capacitance Fref.

Figure 5:
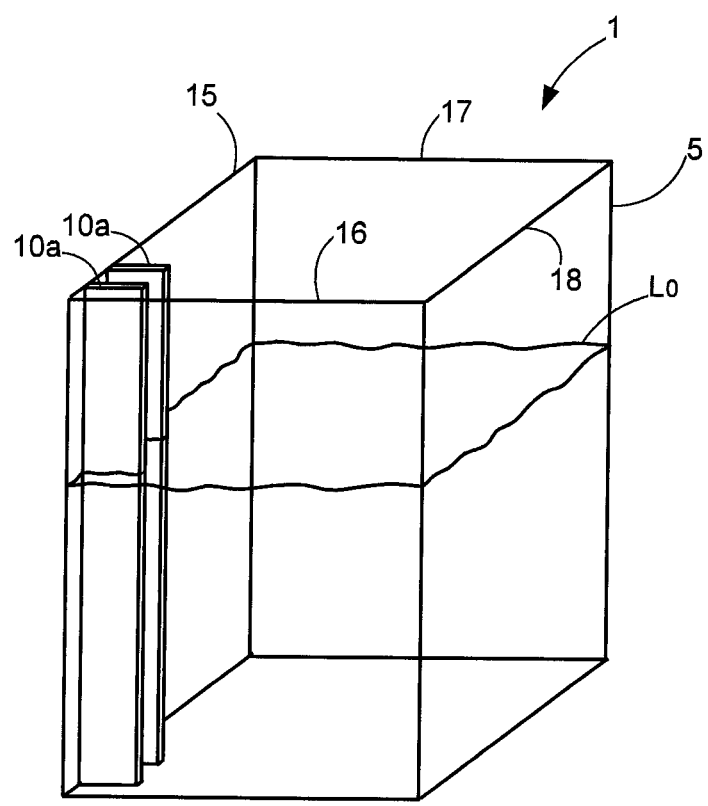
FIG. 5 is a diagrammatic view of a second example embodiment of a fluid container having a pair of capacitive electrodes situated in a corner.
Figure 6:
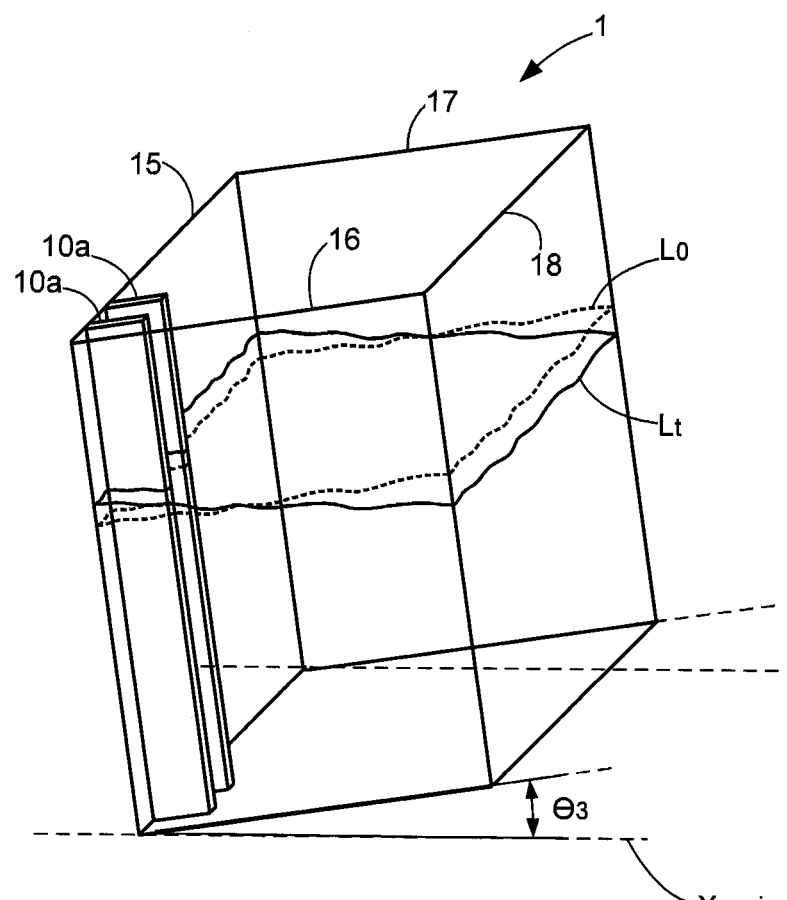
FIG. 6 is a diagrammatic view of the fluid container of FIG. 5 tilted by an angle θ3 towards the side where the pair of capacitive electrodes is situated.
Figure 7:
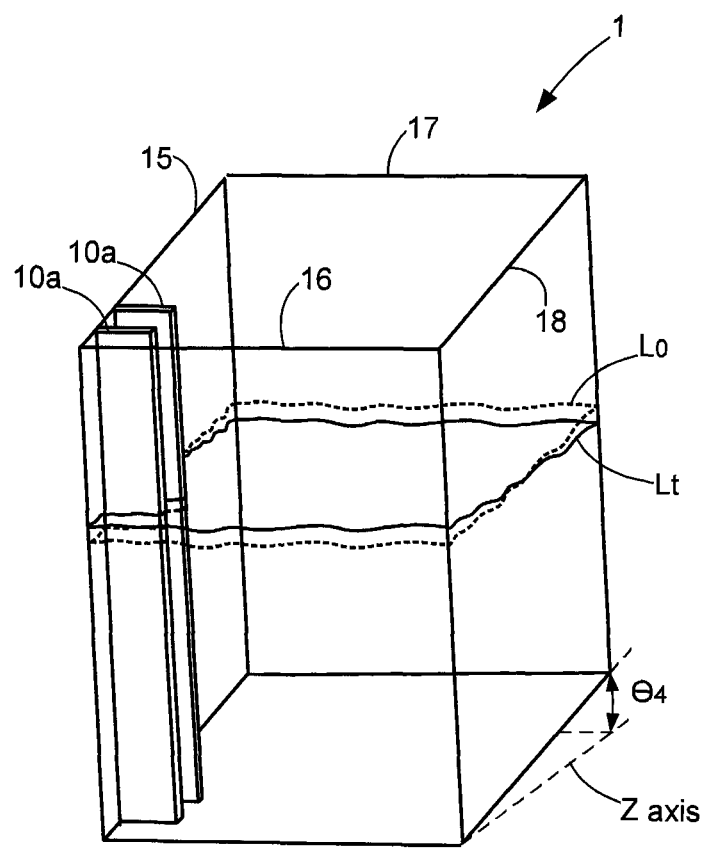
FIG. 7 is a diagrammatic view of the fluid container of FIG. 5 tilted towards the second side by an angle θ4.

FIG. 5 is a view of a second example embodiment of a fluid container 1 with the pair of capacitive electrodes 10a disposed on a portion of the first side 15 near the second side 16. FIG. 6 is a diagrammatic view of the fluid container 1 of FIG. 5 tilted by an angle θ3 towards the first side 15 while FIG. 7 is a view of the fluid container 1 of FIG. 5 tilted towards the second side 16 by an angle θ4. As shown in FIGS. 6 and 7, initial and later capacitance readings from the capacitive electrodes 10a may be used to detect tilting towards the first side 15 or the second side 16.

Figure 8:
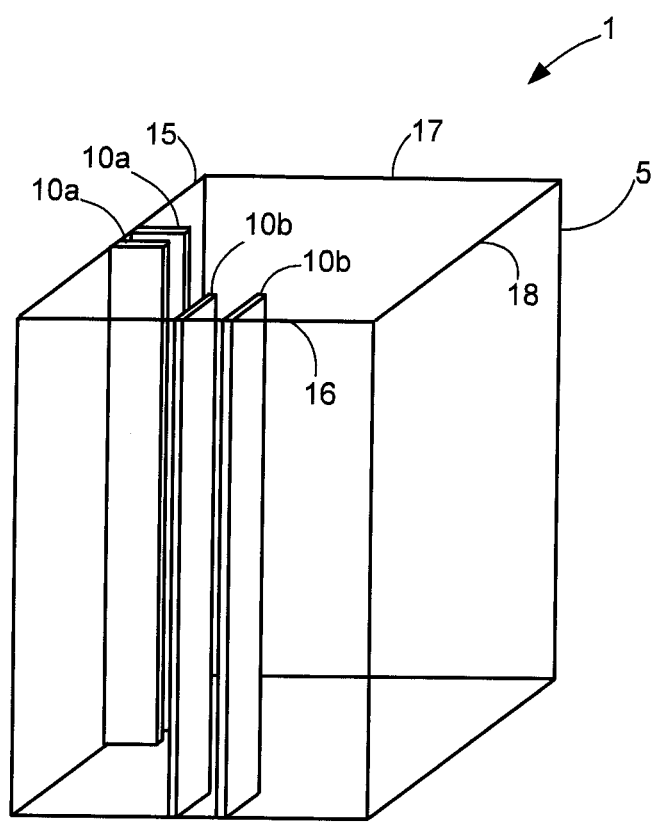
FIG. 8 is a diagrammatic view of a third example embodiment of a fluid container having two pairs of capacitive electrodes situated on adjacent sides of the container.
Figure 9C:
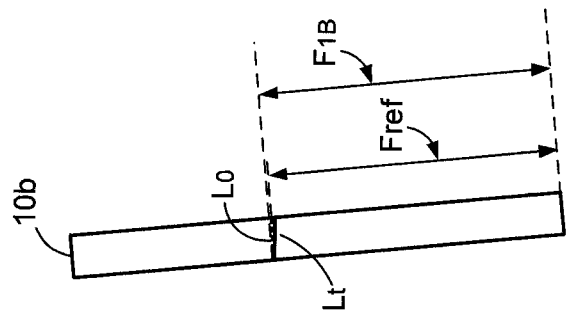
FIGS. 9A, 9B and 9C are diagrammatic views of the fluid container of FIG. 8 and the two pairs of capacitive electrodes tilted towards the location of the first pair of capacitive electrodes by an angle θ5.
Figure 9B:
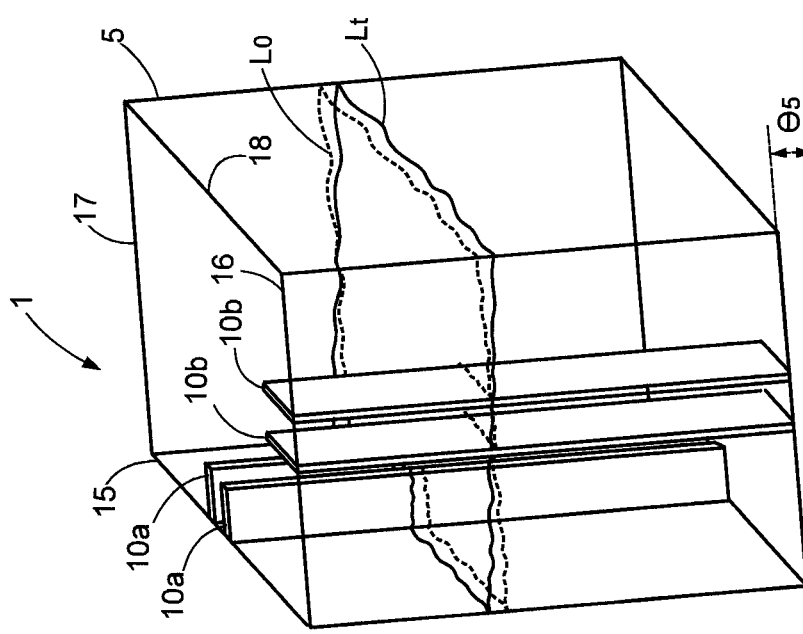
Figure 9A:
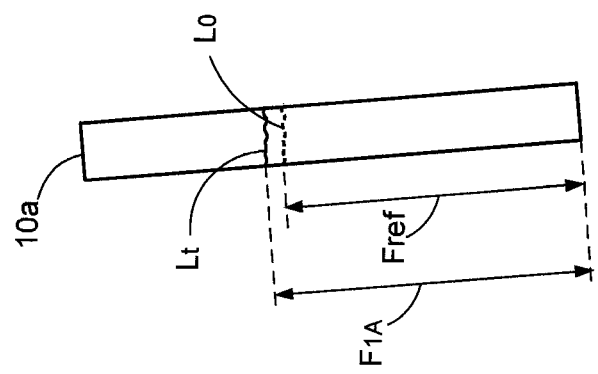
Figure 10C:
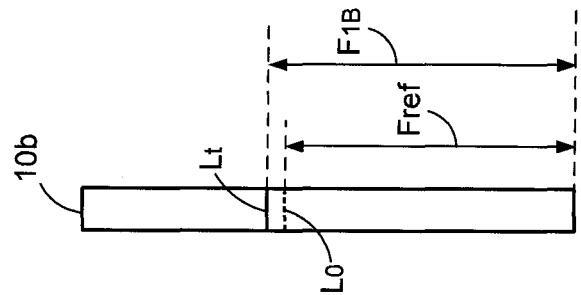
FIGS. 10A, 10B and 10C are diagrammatic views of the fluid container of FIG. 8 and the two pairs of capacitive electrodes tilted towards the location of the second pair of capacitive electrodes by an angle θ6.
Figure 10B:
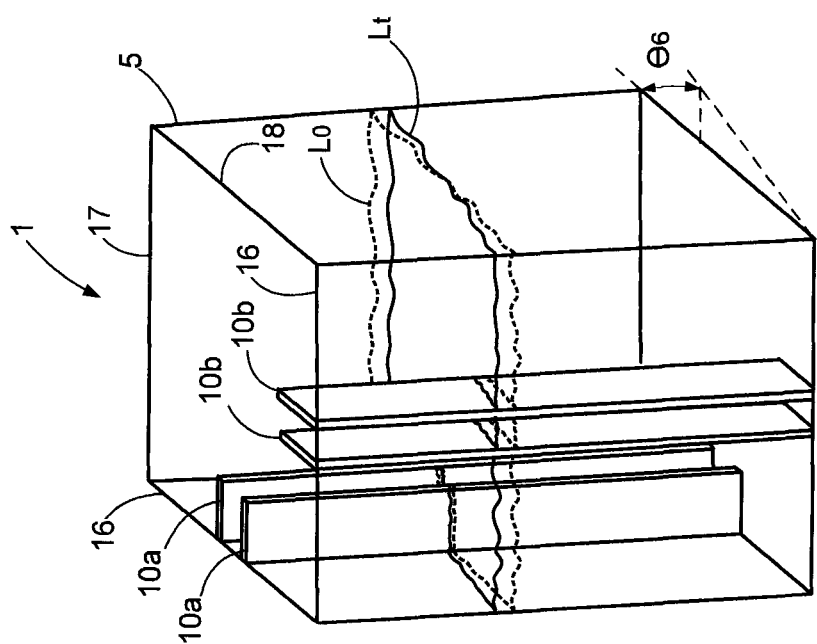
Figure 10A:
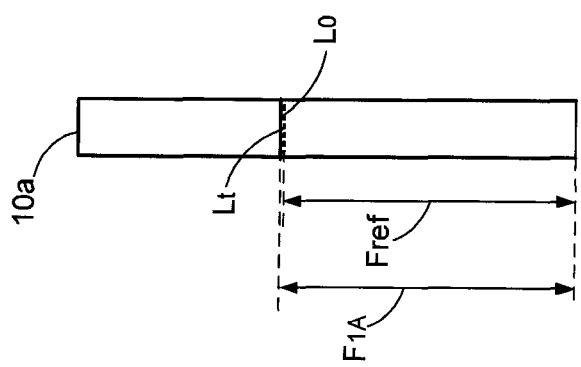

FIG. 8 shows a third example embodiment of the present disclosure where a second pair of capacitive electrodes 10b is disposed on the second side 16 of the housing 5. In this embodiment, both pairs of capacitive electrodes 10a, 10b may be expected to provide approximately equal capacitance readings when the container 1 is not tilted. When the container 1 of FIG. 8 is tilted, as shown in FIG. 9B, the two pairs of capacitive electrodes 10a, 10b may provide capacitance readings F1A, F1B corresponding to the volume of fluid between each respective pair of capacitive electrodes 10a, 10b, as shown in FIGS. 9A and 9B. Tilting of the container 1 may be determined based on the variance between the capacitance readings F1A, F1B and the reference capacitance Fref. Tilting may also be determined base only on the variance between the capacitance readings F1A and F1B. FIGS. 9A and 10A show the effect of tilting on the volume of fluid between the capacitive electrodes 10a. FIGS. 9C and 10C show the effect of tilting on the volume of fluid between the capacitive electrodes 10b.

Figure 11:
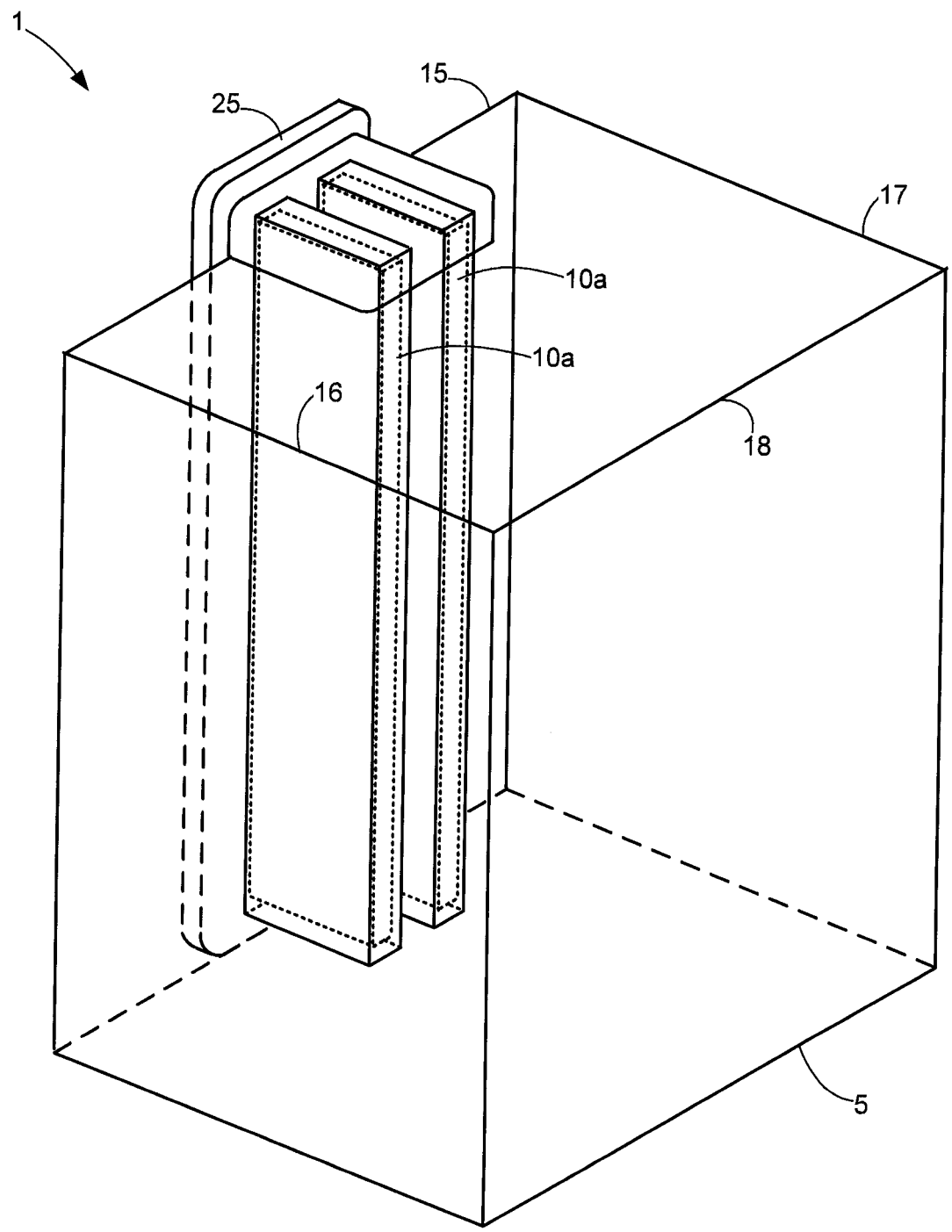
FIG. 11 is a diagrammatic view of a fourth example embodiment of the fluid container having a pair of capacitive electrodes installed in a support material so that the capacitive electrodes are not in direct contact with the fluid.

In FIG. 11, a fourth example embodiment of the present disclosure is shown. A container 1 to hold a volume of fluid includes a housing 5, at least one pair of capacitive electrodes 10a disposed on the first side 15 of the interior of the container 1 and a support material 25 for holding the at least one pair of capacitive electrodes 10a. In this embodiment, the capacitive electrodes 10a may not be in direct contact with the fluid in the container 1.

The support material 25 may hold the at least one pair of capacitive electrodes 10a and may provide the surfaces of the capacitive electrodes 10a with a cover such that there is no direct contact between the capacitive electrodes 10a and the fluid. In this example embodiment, the possibility of any chemical reaction between the capacitive electrodes 10a and the fluid is small thus, the chemical composition of the fluid may be preserved and the integrity of the capacitive electrodes 10a may not be affected. Support material 25, including the capacitive electrodes 10a, may be also configured as a modular nosepiece that attaches to containers of various sizes. In this way, commonality in manufacturing may exist with in-tank sensors regardless of the size of the container to which they attach.

Figure 12A:
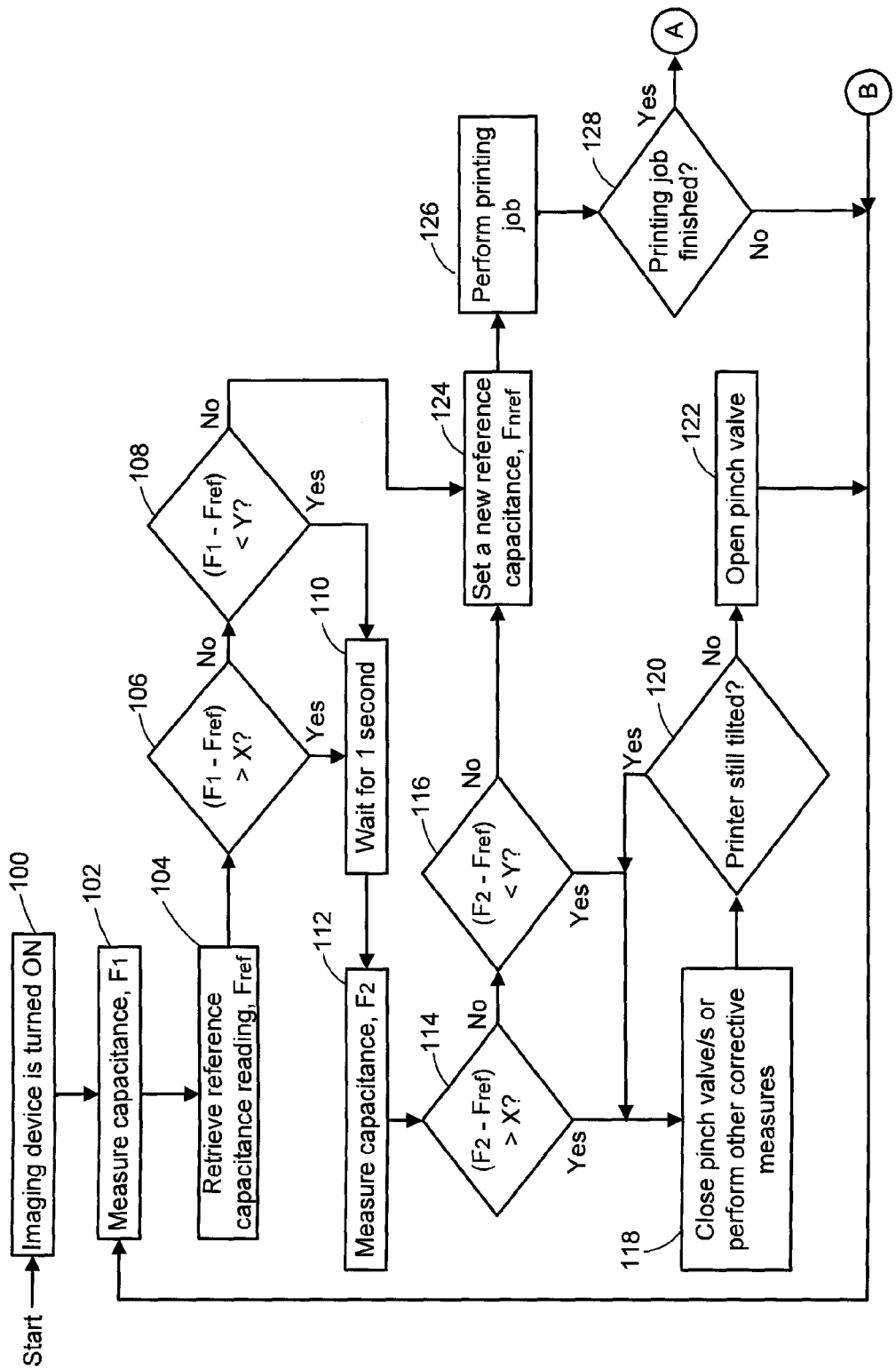
FIGS. 12A and 12B are first and second parts of a flow chart showing one example method of detecting tilting of the fluid container of FIG. 1.
Figure 12B:
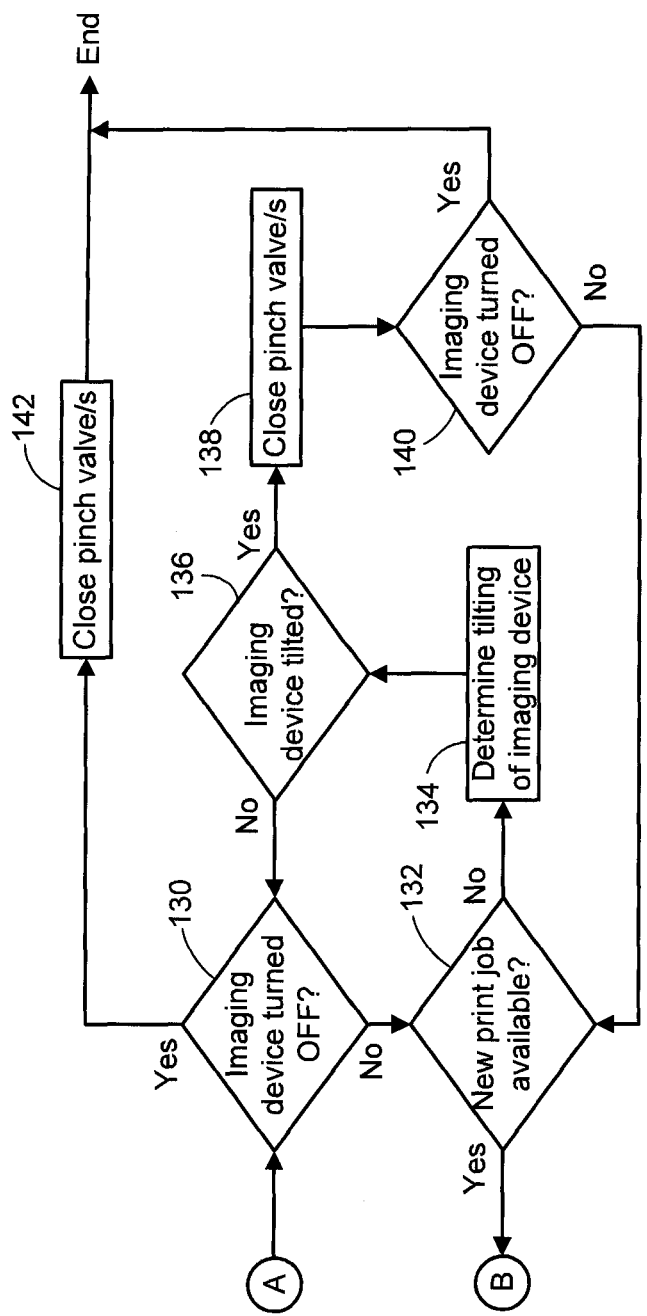

FIGS. 12A and 12B outline a method of detecting tilting of the container 1. At the start of operation, the imaging device is turned on (100). When performing a print job, for example, the capacitive electrodes 10a may provide a controller in the imaging device a first capacitance reading F1 (102) corresponding to the volume of fluid between the pair of capacitive electrodes 10a. A previously-saved reference capacitance Fref may be retrieved by the controller (104). The first capacitance reading F1 may be compared to the reference capacitance Fref (106). A variance between the first capacitance reading F1 and the reference capacitance Fref may equate to the container 1 being tilted, however, not all variances between the capacitance readings F1 and the reference capacitance Fref is due to tilting of the container. Variances between the capacitance reading F1 and the reference capacitance Fref may also be caused by the vibration of the container 1 during operation. Also, not all tilting of the container 1 may cause problem during operation of the imaging device. Minimal tilting, such as those that may not cause the fluid to leak out of the printhead nozzles, may be considered allowable since they do not necessitate the performance of any corrective measures. The vibration of the container 1 and the minimal tilting, along with other factors that affect the level of fluid inside the container 1, may be considered during the determination of a container tilt. Thus, the variance between the first capacitance reading F1 and the reference capacitance Fref may be compared to a previously set allowable positive variance X (106) and negative variance Y (108) in order to determine whether a variance between the first capacitance reading F1 and the reference capacitance Fref is indeed caused by tilting of the container 1 and to determine if the extent of tilting necessitates the performance of corrective measures. Other factors that may be taken into consideration in determining the allowable positive variance X and negative variance Y are the design of the imaging device particularly its tolerance to tilting, the amount of fluid consumed in a previous operation and others. Since it is already known that vibration of the container during operation may cause a variance between the first capacitance reading F1 and the reference capacitance Fref, it is advisable to obtain a second capacitance reading F2 if the variance between the first capacitance reading F1 and the reference capacitance Fref is outside the allowable variances X, Y. Performing a print job may be suspended for a period of time, such as for one second (110) to allow the fluid in the container 1 to settle so that the second capacitance reading F2 may not be affected by any vibration of the container 1. After the lapse of one second, the second capacitance reading F2 may be obtained (112). The second capacitance reading F2 may be compared to the reference capacitance Fref (114, 116) to determine whether the container 1 is indeed tilted or not. When a tilt is detected and the extent of tilting is outside the allowable variances X, Y, the performance of the printing job may be suspended and appropriate pinch valves may be closed (118) to avoid leaking of fluid in the printhead. Alternatively, a user may be prompted to perform corrective measures. The system determines if tilt remains and the suspension of operation may be extended until appropriate corrective measure is performed (120).

If the variance between the first capacitance reading F1 and the reference capacitance Fref is within the allowable positive variance X, the variance may be compared to the allowable negative variance Y (108). If the variance is outside the allowable negative variance Y, the performance of the printing job may be suspended for one second (110) and similar procedure may be performed as when the variance is outside the allowable positive variance X. If, on the other hand, the variance is within the allowable negative variance Y, no tilt is detected, the first capacitance reading F1 may be saved into the memory for use in determining the next reference capacitance Fnref (124) and operation may be continued (126).

In determining the new reference capacitance Fnref, the previous capacitance reading F1 or F2, as the case may be, which is within allowable variances X, Y, may be made as the new reference capacitance Fnref in the next cycle of operation. The new reference capacitance Fnref may also be based on the previous capacitance reading F1 or F2, as the case may be, which is within allowable variances X, Y, and the amount of fluid consumed during a printing operation.

When tilt is detected and corrective measure is performed, the previously-closed pinch valves may be opened (122). When the printing job is finished, the imaging device may be turned off (130) by the user and the appropriate pinch valves may be closed (142) to prevent fluid from leaking when the imaging device is tilted unintentionally during a state of non-use, such as when the imaging device is moved or transported. On the other hand, when the printing job is finished, but the imaging device is not turned off (130), availability of a new print job may be determined (132). If a new print job is available, the same procedure for determining tilting while performing a print job may be repeated. However, if no new print job is available (132), and the imaging device is kept on (130), tilting may be determined (134). If a tilt is detected (136), appropriate pinch valves may be closed (138) to avoid leaking of fluid in the printhead. A user may turn off the imaging device at this stage (140) to end an operation.

When a tilt is detected (136), with the appropriate pinch valves closed (138), and the imaging device not turned off (140), availability of a new print job may be determined (132). If a new print job is available (132), the entire procedure for detecting a tilt may be repeated (126). If no new print job is available (132), tilting may be monitored continuously (134).

Figure 13:
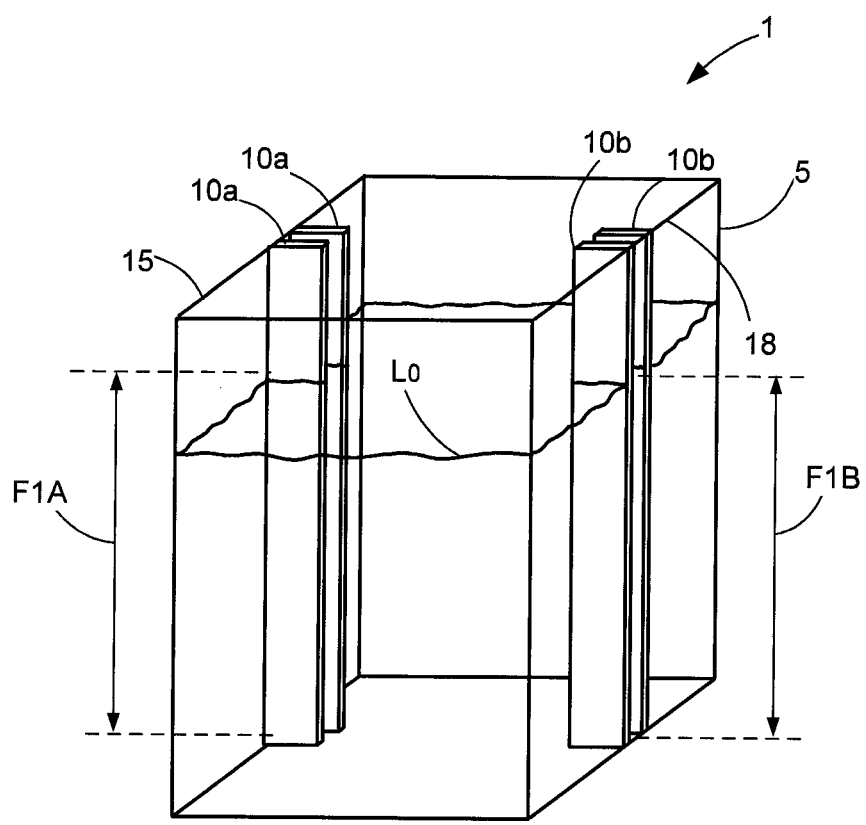
FIG. 13 is a diagrammatic view of an alternate embodiment of a fluid container having two pairs of capacitive electrodes situated on opposing sides.
Figure 14:
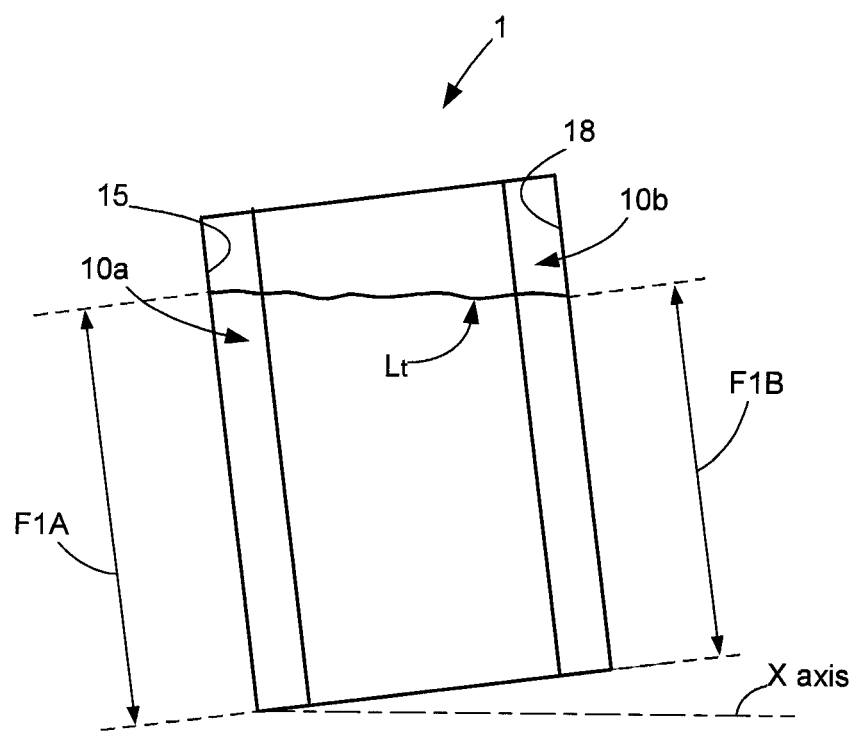
FIG. 14 is a diagrammatic view of the fluid container of FIG. 13 tilted toward the location of a first pair of capacitive electrodes.
Figure 15:
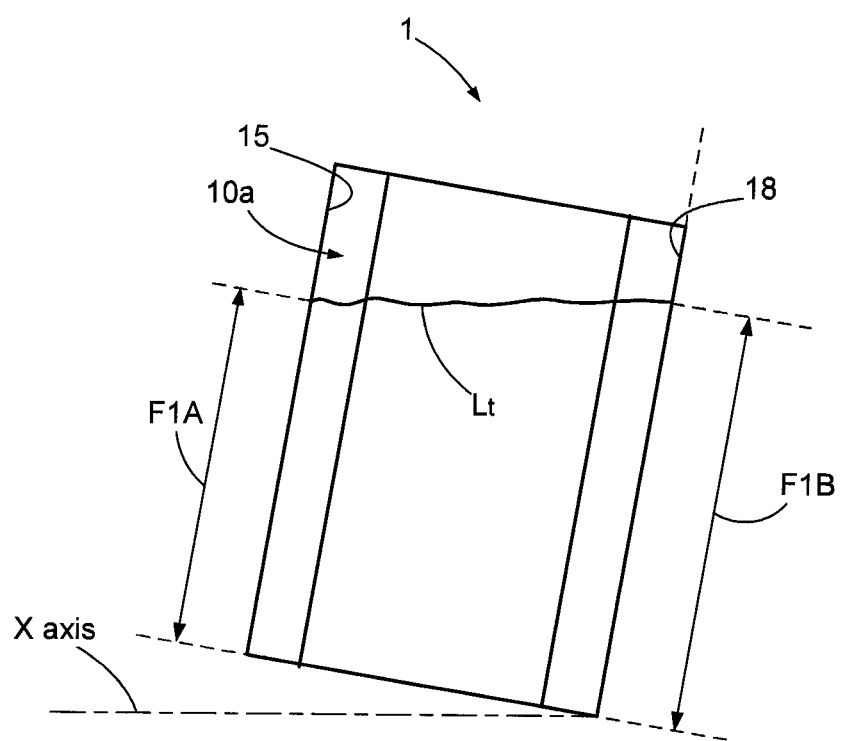
FIG. 15 is a diagrammatic view of the fluid container of FIG. 13 tilted toward the location of a second, opposite pair of capacitive electrodes.

In still another embodiment, FIG. 13 depicts two pairs of capacitive electrodes 10a, 10b disposed on opposing sides of the housing 5. As is shown, a first pair of capacitive electrodes 10a is disposed on the first side 15 of the housing while a second pair of capacitive electrodes 10b is disposed on an opposing parallel side, e.g., the fourth side 18. When the container is not tilted, both pairs of capacitive electrodes 10a, 10b provide an initial capacitance reading. The readings may be equal to one another or not. Later, when the container is tilted toward either the first side 15 as shown in FIG. 14 or towards the fourth side 18 as shown on FIG. 15, the capacitance readings of the electrodes either increase or decrease from their initial readings. If the reading F1A at electrode pair 10a increases while that F1B at electrode pair 10b decreases, as in FIG. 14, it is known that the container tilts in the forward direction toward the electrode pair 10a. On the other hand, if the reading F1A at electrode pair 10a decreases while that F1B at electrode pair 10b increases, as in FIG. 15, it is known that the container tilts in the rearward direction toward the electrode pair 10b. In this way, the method of determining tilt of a container varies from earlier embodiments by avoiding a need for taking a reference reading. So long as the capacitance reading for one pair of electrodes increases while the reading for the other pair of electrodes decreases over the same period of time, tilt of housing is made known and corrective action can be taken, if necessary. Also, an amount or extent of tilting may be ascertained according to how drastic the readings vary from their earlier readings. Amounts can be grouped according to percentage change, comparisons of raw values to other values, or by other techniques known to skilled artisans.

The foregoing illustrates various aspects of the present disclosure. It is not intended to be exhaustive. Rather, it is chosen to provide the best illustration of the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A container to hold a volume of fluid, comprising:
a housing defining an interior to retain the volume of fluid; and
at least one pair of opposed electrodes disposed in the interior forming a capacitor having a capacitance that varies in response to an amount of fluid existing between the opposed electrodes, a higher said capacitance corresponds to a higher said amount of fluid existing between the opposed electrodes, wherein the at least one pair of opposed electrodes is configured to provide a first and a second capacitance measurement value to a controller configured to compare the first to the second capacitance to ascertain tilt of the housing by determining whether the second capacitance is higher than the first capacitance, wherein the at least one pair of opposed electrodes is disposed on only a first side of the interior.

2. The container of claim 1, wherein the at least one pair of opposed electrodes is disposed vertically on a portion of the first side of the interior closer to a second side of the interior than to a third side of the interior that directly opposes the second side, the second side being adjacent and substantially transverse to the first side.

3. A container to hold a volume of fluid, comprising:
a housing defining an interior to retain the volume of fluid;
and at least one pair of opposed electrodes disposed in the interior forming a capacitor having a capacitance that varies in response to an amount of fluid existing between the opposed electrodes, a higher said capacitance corresponds to a higher said amount of fluid existing between the opposed electrodes, wherein the at least one pair of opposed electrodes is configured to provide a first and a second capacitance measurement value to a controller configured to compare the first to the second capacitance to ascertain tilt of the housing by determining whether the second capacitance is higher than the first capacitance,
wherein the at least one pair of electrodes is not in direct contact with the fluid in the interior and the at least one pair of opposed electrodes is disposed on only a first side of the interior.

4. The container of claim 3, wherein the at least one pair of opposed electrodes is disposed vertically on a portion of the first side of the interior closer to a second side of the interior than to a third side of the interior that directly opposes the second side, the second side being adjacent and substantially transverse to the first side.

5. A container to hold a volume of fluid, comprising:
a housing defining an interior to retain the volume of fluid;
a first pair of opposed electrodes disposed in the interior forming a capacitor having a capacitance that varies in response to an amount of fluid existing between the opposed electrodes, a higher said capacitance corresponds to a higher said amount of fluid existing between the opposed electrodes, wherein the first pair of opposed electrodes is configured to provide a first and a second capacitance measurement value to a controller configured to compare the first to the second capacitance to ascertain tilt of the housing by determining whether the second capacitance is higher than the first capacitance; and
a second pair of opposed electrodes, wherein the first pair of opposed electrodes are disposed on a first side of the interior and the second pair is disposed on a second side of the interior that is adjacent and is substantially transverse to the first side.

6. A container to hold a volume of fluid, comprising:
a housing defining an interior to retain the volume of fluid;
and at least one pair of opposed electrodes disposed in the interior forming a capacitor having a capacitance that varies in response to an amount of fluid existing between the opposed electrodes, a higher said capacitance corresponds to a higher said amount of fluid existing between the opposed electrodes, wherein the at least one pair of opposed electrodes is configured to provide a first and a second capacitance measurement value to a controller configured to compare the first to the second capacitance to ascertain tilt of the housing by determining whether the second capacitance is higher than the first capacitance, wherein the at least one pair of electrodes is not in direct contact with the fluid in the interior; and
further including a second pair of opposed electrodes, wherein the at least one pair of opposed electrodes are disposed on a first side of the interior and the second pair is disposed on a second side of the interior and the second side is adjacent and is substantially transverse to the first side.

* * * * *